United States Patent [19]
Elvin

[11] 4,019,108
[45] Apr. 19, 1977

[54] DRIVE EQUIPMENT SUPPLIED WITH DIRECT CURRENT

[75] Inventor: Sten Elvin, Vasteras, Sweden
[73] Assignee: ASEA Aktiebolag, Vasteras, Sweden
[22] Filed: Jan. 8, 1976
[21] Appl. No.: 647,501
[30] Foreign Application Priority Data
    Jan. 20, 1975  Sweden .................... 7500545
[52] U.S. Cl. ..................... 318/353; 318/356; 318/139
[51] Int. Cl.² .................................. H02P 7/10
[58] Field of Search .......... 318/139, 246, 269–271, 318/326, 338, 345, 355–359, 526–529, 532

[56] References Cited
UNITED STATES PATENTS

| | | | |
|---|---|---|---|
| 3,041,478 | 6/1962 | Gabor | 318/345 G |
| 3,492,557 | 1/1970 | Brown | 318/345 G |
| 3,753,077 | 8/1973 | Anderson et al. | 318/345 C |
| 3,792,326 | 2/1974 | First | 318/251 |
| 3,906,317 | 9/1975 | Narita | 318/356 |

Primary Examiner—Robert K. Schaefer
Assistant Examiner—M. Mutter
Attorney, Agent, or Firm—Watson Cole Grindle & Watson

[57] ABSTRACT

Drive equipment supplied with direct current, which includes a DC motor with a series field winding and with a semi-conductor rectifier arrangement in parallel with the field winding and working in pulse operation for variable shunting of the field winding. The controllable semi-conductor rectifier has a reactor connected in series with it. A load object is connected in parallel to the semi-conductor rectifier. The load object may be an accumulator battery series-connected with a second semi-conductor rectifier which blocks the battery voltage.

6 Claims, 5 Drawing Figures

DRIVE EQUIPMENT SUPPLIED WITH DIRECT CURRENT

BACKGROUND OF THE INVENTION

1. Field of the Invention

The present invention relates to drive equipment supplied with direct current, with a DC motor with a series field winding and with a controllable semi-conductor rectifier, arranged in parallel with the field winding and working in pulse operation, for variable shunting of the field winding.

2. The Prior Art

Equipment of this kind is previously known, for example, through the French Pat. No. 1,373,565. This describes a DC series motor, the field winding of which is parallel-connected to a controllable semi-conductor rectifier (a thyristor with a turn-off circuit). In the field weakening range, that is at relatively high speed, the thyristor is controlled so that it works in pulse operation, thus obtaining the desirable variable shunting of the field winding.

During the intervals when the thyristor is conducting, the voltage across the field winding is zero. During the intervals when the thyristor is non-conducting, the whole motor current flows through the field winding and the voltage across the winding will then become relatively high, in a typical case some ten or twenty volts. The voltage over the winding thus varies periodically between zero and the last-mentioned value and contains a strong alternating voltage component. It has been found that this component causes considerable difficulties in commutation for the motor.

SUMMARY OF THE INVENTION

The invention relates to drive means of the above-mentioned kind, in which the voltage variations over the field winding are reduced and in whichtherefore the disadvantages mentioned are reduced or eliminated.

According to the invention, the controllable semi-conductor rectifier is arranged in a parallel connection with the field winding which connection also includes a reactor in series with the semi-conductor rectifier. A load object is connected in parallel to the semi-conductor rectifier. The load object may be a battery series-connected with a second semi-conductor rectifier which blocks the battery voltage.

BRIEF DESCRIPTION OF THE DRAWINGS

In the following the invention will be described in more detail with reference to the accompanying drawings.

DESCRIPTION OF THE PREFERRED EMBODIMENTS

Figure 1:
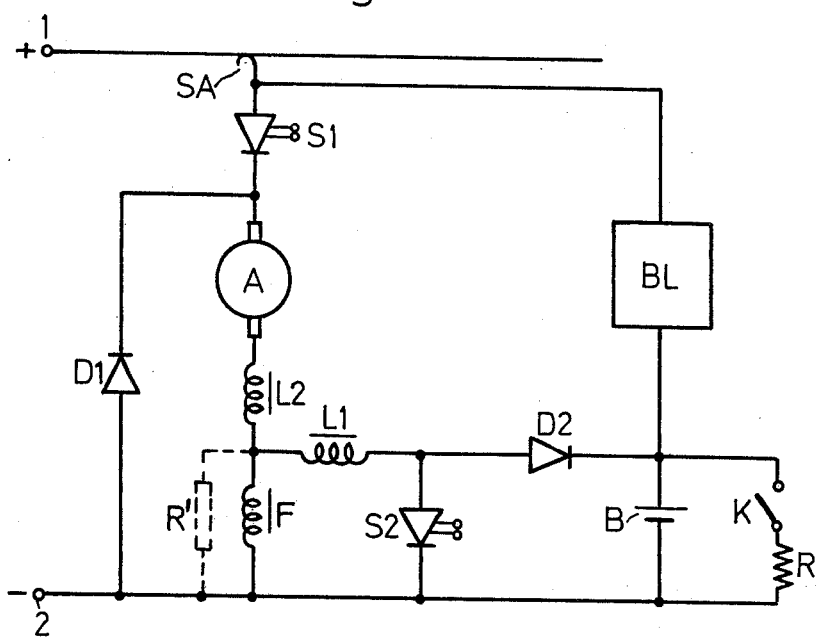
FIG. 1 shows an example of a device according to the invention.

FIG. 1 shows two conductors 1 and 2 supplied with direct voltage, between which equipment according to the invention is connected. The conductor 1 may consist of a contact line. The equipment may be mounted in a rail vehicle and be fed from the conductor 1 over a current collector SA. The conductor 2 may consist of the rail.

The equipment comprises a DC drive motor of series type for propulsion and possibly also braking of the vehicle. The motor has the armature A and the field winding F. In a typical case, the motor can be designed for a feeding voltage of 600 V (between conductors 1 and 2) and have a maximum power of 100 kW. A controllable semi-conductor rectifier S1 working in pulse operation is arranged in series with the motor. The semi-conductor rectifier may consist, in a known manner, of a thyristor with a turn-off circuit and with control members for controlling the voltage applied to the motor by varying the relation between conducting time and non-conducting time. A reactor L2 for smoothing the motor current is connected in series with the motor (it may be omitted if the inductance of the motor circuit is sufficiently high). A freewheeling diode D1 is antiparallel-connected with the motor.

According to the invention, a reactor L1 in series with a controllable semi-conductor rectifier S2 is connected parallel to the field winding F. The reactor L1 should have an inductance which is at least of the same order of magnitude as the inductance of the field winding and which may suitable be much greater. The rectifier S2 may suitably consist, in a known manner, of a thyristor with a turn-off circuit and with a control member for controlling the thyristor in pulse operation with a variable relation between conducting time and non-conducting time. By varying said relation, the part of the motor current which is shunted past the field winding F can be continuously controlled to the desired value. At motor speeds between zero and a certain value, the basic speed, S2 is continuously non-conducting in known manner, the entire motor current thus flowing through the field winding. When the motor speed is increased from the basic speed, the relation between conducting time and period time for S2 is increased from zero up to such a value that in a typical case about 60 – 70% of the motor current is shunted past the field winding.

During the intervals when S2 is non-conducting, the direct current flows through L1 through a diode D2 to a load object consisting of an accumulator battery B. The battery will thus be charged from the motor circuit by means of the DC static convertor formed of L1, S2 and D2. This charging takes place as soon as the motor is working above the basic speed and current is shunted past the field winding by controlling S2 in pulse operation.

The battery voltage in a typical case may amount to 72 V. The components L1, S2 and D2 must then be dimensioned for this voltage and for the maximally by-passed current (for example, 60 – 70% of the maximum motor current).

The battery can be used for feeding auxiliary equipment in the vehicle and/or for feeding the drive motor in the event of a drop-out of the main feeding source 1-2, as will be described below.

To prevent overcharging of the battery, a resistor R is arranged to be parallel-connected to the battery with the help of a switch K which is operated in dependence on the charging condition of the battery. The resistor R is suitably dimensioned so that it is able to take up the maximum current flowing from the DC convertor L1-S2-D2 to the battery B.

Battery charging equipment BL may be used to charge the battery or keep it charged when necessary.

As mentioned at the beginning, the voltage across a rectifier working in pulse operation has a strong alternating voltage component. By arranging a reactor L1 in series with the rectifier S2, according to the invention, a voltage division of the alternating voltage component will take place between the inductance of the field winding and the inductance of the reactor L1. Only part of the alternating voltage component is therefore applied across the field winding, and this part becomes smaller the greater the inductance of the reactor L1 is. According to the invention, therefore, a very considerable decrease in the alternating voltage component across the field winding can be obtained.

A further improvement can be obtained by connecting a resistor R' in parallel with the field winding, according to FIG. 1. This resistor is dimensioned, for example, so that it by-passes 5–10% of the field current. Since in practice S2 will be working with a high pulse frequency, normally the impedanced for the alternating voltage components will be high in the field F and the reactor L1 compared with the resistance of the resistor R1. The reactor L1 will therefore take up the main part of the alternating voltage component and only a minor part will be applied across the field winding.

Provided that the energy fed to the batter B can be utilized, field shunting in equipment according to the invention is performed essentially without losses, or at least with very low losses.

If the power losses have a minor importance or if it is suitable for other reasons, the batter B can be omitted and the load object instead can consist of a resistor connected in parallel with the rectifier S2, which resistor is dimensioned so that it may take up the power removed by shunting. The diode D2 will then be superfluous. The resistor can be chosen so that a permanent shunting of about 5–10% of the field current is obtained.

Alternatively, the last-mentioned resistor can be parallel-connected to a capacitor. To avoid an instantaneous discharge of the capacitor when S2 is made conducting, a diode or a further resistor can be connected in series with the parallel-connection formed of the capacitor and the first-mentioned resistor. The capacitor prevents high voltage peaks across the components included in the DC convertor S2-L1.

Figure 2:
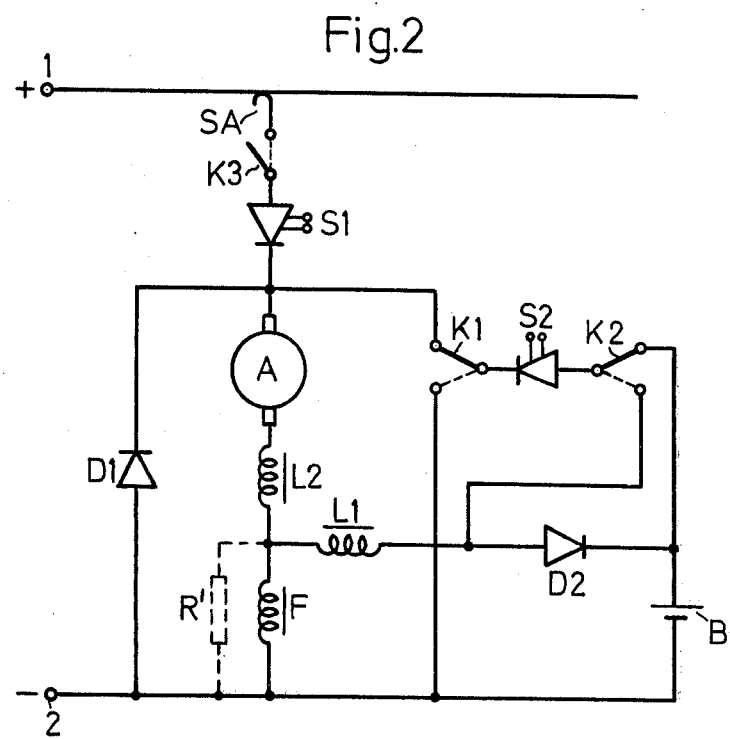
FIG. 2 shows an embodiment of the invention, in which the semi-conductor rectifier used for shunting the field is also utilized for driving the motor in the event of a drop-out of the voltage of the main feeding source.

FIG. 2 shows an advantageous embodiment of the invention, in which the battery which is charged by the by-passed current may be used for feeding the drive motor. A need of such operation may arise in case of disappearance of the contact line voltage or when it is necessary to be able to drive the vehicle over short distances where there is no contact line. The connection in FIG. 2 is the same as that in FIG. 1, with the exception of the switches K1, K2 and K3. When these switches lie in the positions marked by dashed lines in the figure, the connection corresponds completely to that in FIG. 1.

When K3 lies in the position shown in FIG. 2, the drive equipment is disconnected from the contact line and cannot be fed from its ordinary feeding source. The same is the case if the contact line voltage drops out, or if no contact line is available. The switches K1 and K2 are then put in the positions shown in FIG. 2. The battery B will then be connected to the motor and supplies it with current through the rectifier S2, and the motor can be controlled with the aid of S2 in the same way as it is controlled by means of S1 in normal operation.

The connection has the advantage that the rectifier S2 and its turn-off circuits are dimensioned to work, in normal operation, at a voltage equal to the battery voltage and a current of the same order of a magnitude as the rated current of the motor (for instance, 60–70% thereof). This means that the circuits will work faultlessly at the low voltage prevailing when the motor is fed from the battery B, and that the motor can be driven with a current and thus a tractive force which is of the same order of magnitude as in normal operation.

The rectifier S1 with its turn-off circuits are dimensioned for the contact line voltage which is high in comparison with the battery voltage. In the turn-off circuits which are normally used, the maximum current which can be extinguished is proportional to the feeding voltage. If the rectifier S1 were to be used for controlling the motor in case of feeding from the battery, the motor current would then have to be limited to a very low value because of the low battery voltage, which in practice would lead to an unacceptably low tractive force.

Using the same rectifier for shunting in normal operation as well as for controlling the motor in case of battery feeding, according to FIG. 2, thus affords considerable advantages.

It is known that the drive motor can be used for braking a vehicle. It is then advantageous to feed the field winding F from the battery B, in which case an electric brake can be applied independently of the contact line voltage. The voltage of the battery B is also better adjusted to the low voltage of the field winding F than is the high voltage of the contact line.

Figure 3A:
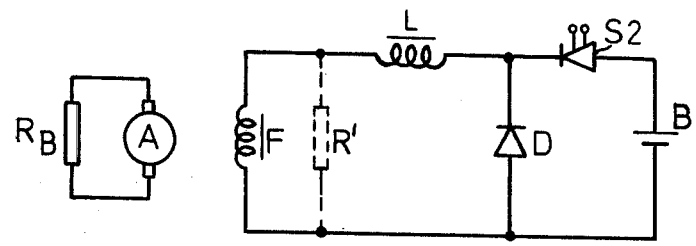
FIGS. 3a, 3b and 3c show examples of how the semi-conductor rectifier of the invention is also utilized for some different forms of electrical braking.

FIG. 3a shows a case with pure resistance braking, where the armature A is parallel-connected with a braking resistor $R_B$. The field current, and thus the braking force, is controlled by the rectifier S2. The free-wheeling diode D may be constituted here either by D1 or D2 and the reactor L by L1 or L2.

Figure 3B:
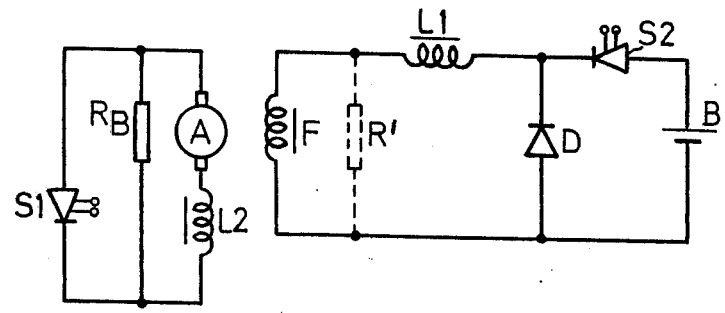

FIG. 3b shows an extension of the preceding case, the rectifier S1 working in parallel with the braking resistor $R_B$. In this way a high braking force is obtained also at a low speed when the rectifier S1 can reduce the effective resistance of the braking resistor $R_B$ by working in pulse operation.

Figure 3C:
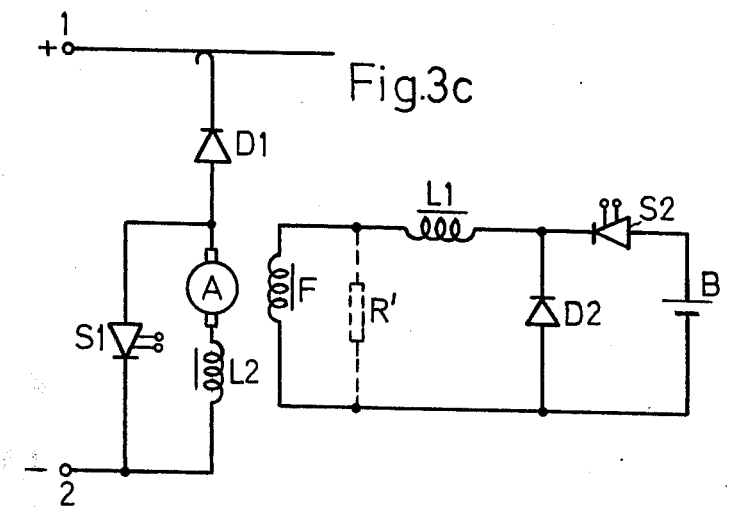

FIG. 3c shows a modification using a regenerative brake.

I claim:

1. Drive equipment supplied with direct current, having a DC motor with a series field winding and means connecting a controllable semi-conductor rectifier working in pulse operation and a reactor in series with each other and in parallel with the field winding, for variable shunting of the field winding, means connecting a load object in parallel to the semi-conductor rectifier.

2. Drive equipment supplied with direct current according to claim 1, in which the load object comprises a resistor.

3. Drive equipment supplied with direct current according to claim 2, in which a capacitor is connected in parallel with the resistor.

4. Drive equipment supplied with direct current according to claim 1, in which the load object comprises an accumulator battery series-connected with a second semi-conductor rectifier poled to block the battery voltage.

5. Drive equipment supplied with direct current according to claim 4, in which said means comprise connection members connecting the battery to the motor through the controllable semi-conductor rectifier working in pulse operation for feeding the motor from the battery.

6. Drive equipment supplied with direct current according to claim 4, in which said means comprise connection members connecting the battery to the field winding through the controllable semi-conductor rectifier working in pulse operation for feeding the field winding from the battery in the case of electrical braking.

* * * * *